(No Model.) 4 Sheets—Sheet 1.

J. W. SMALLMAN.
PNEUMATIC TIRE AND RIM FOR WHEELS.

No. 521,482. Patented June 19, 1894.

WITNESSES:
F. J. Rapson.
N. F. Cain.

INVENTOR:
James W. Smallman.

(No Model.) 4 Sheets—Sheet 2.

J. W. SMALLMAN.
PNEUMATIC TIRE AND RIM FOR WHEELS.

No. 521,482. Patented June 19, 1894.

WITNESSES:
F. J. Rapson.
H. F. Cain.

INVENTOR:
James W. Smallman

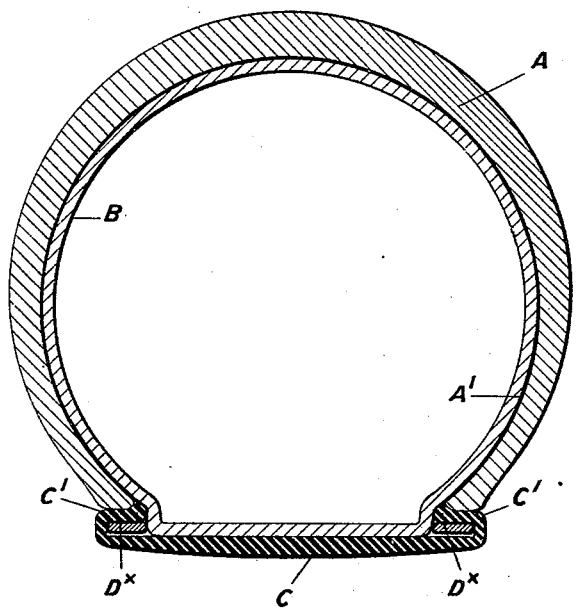

(No Model.) 4 Sheets—Sheet 4.

J. W. SMALLMAN.
PNEUMATIC TIRE AND RIM FOR WHEELS.

No. 521,482. Patented June 19, 1894.

WITNESSES:
F. J. Rapson.
W. F. Cain.

INVENTOR:
James W. Smallman.

UNITED STATES PATENT OFFICE.

JAMES W. SMALLMAN, OF LONDON, ENGLAND.

PNEUMATIC TIRE AND RIM FOR WHEELS.

SPECIFICATION forming part of Letters Patent No. 521,482, dated June 19, 1894.

Application filed November 11, 1893. Serial No. 490,710. (No model.) Patented in England April 15, 1893, No. 7,731; in France October 13, 1893, No. 233,370; in Germany October 25, 1893, No. 75,189, and in Canada April 26, 1894, No. 45,899.

*To all whom it may concern:*

Be it known that I, JAMES WILLIAM SMALLMAN, a subject of the Queen of Great Britain and Ireland, residing at 61 Chancery Lane, London, in the county of Middlesex, England, have invented an Improved Pneumatic-Tired Rim, (in respect whereof I have obtained a patent in France, No. 233,370, bearing date October 13, 1893; in Germany, No. 75,189, bearing date October 25, 1893; in Canada, No. 45,899, bearing date April 26, 1894; in Great Britain, No. 7,731, bearing date April 15, 1893, and have filed an application, No. 43,448, for a patent, not yet granted, in Belgium, to bear date April 18, 1894,) of which the following is a specification.

This invention refers to an improved pneumatic tired rim for the wheels of cycles and other vehicles.

Figure 1:
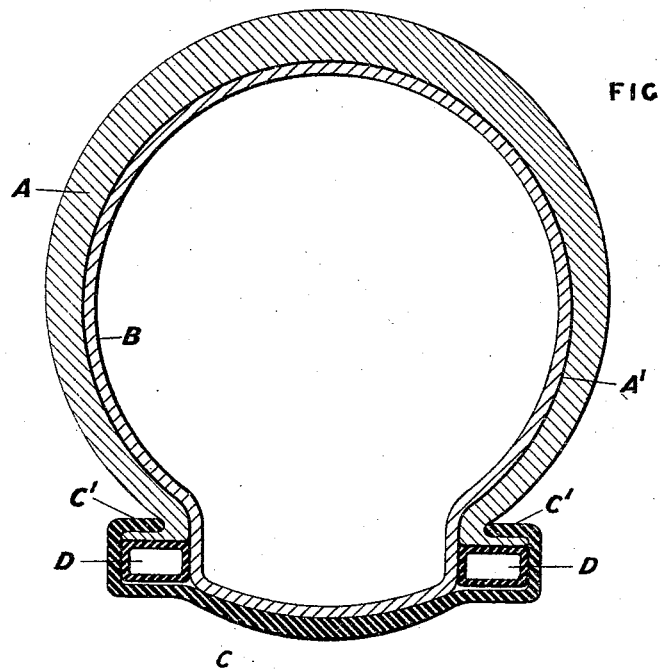
Figure 2:
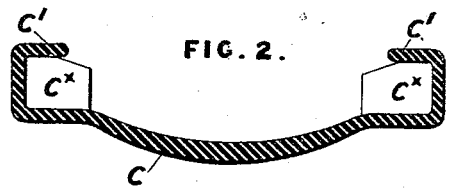
Figure 3:
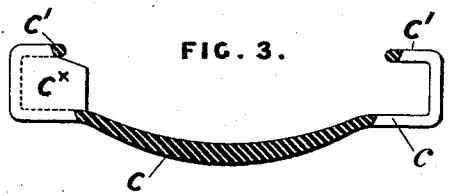
Figure 4:
Figure 5:
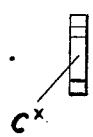
Figure 6:
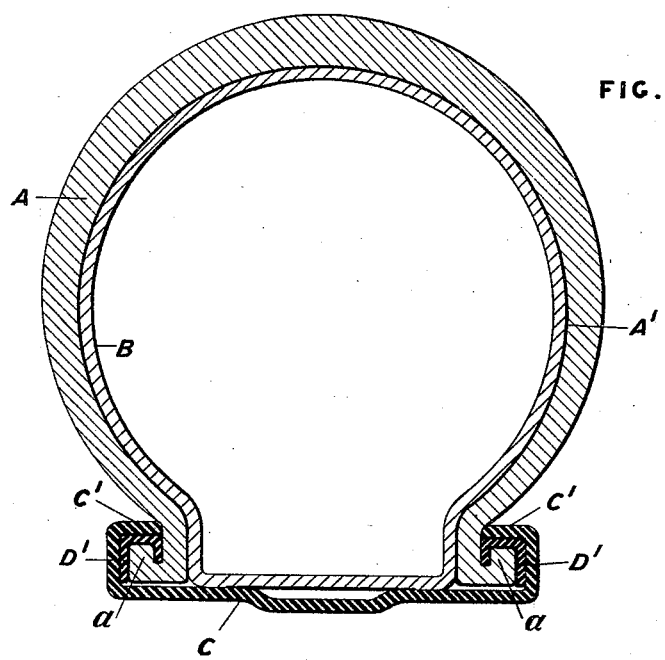
Figure 7:
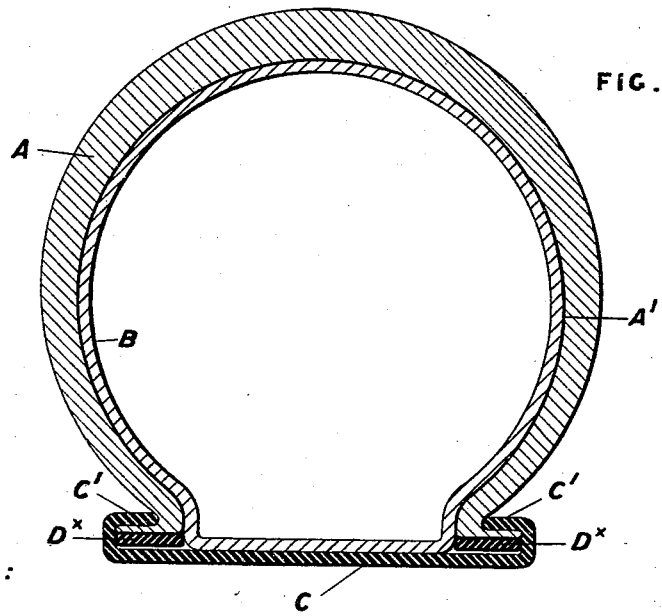
Figure 8:
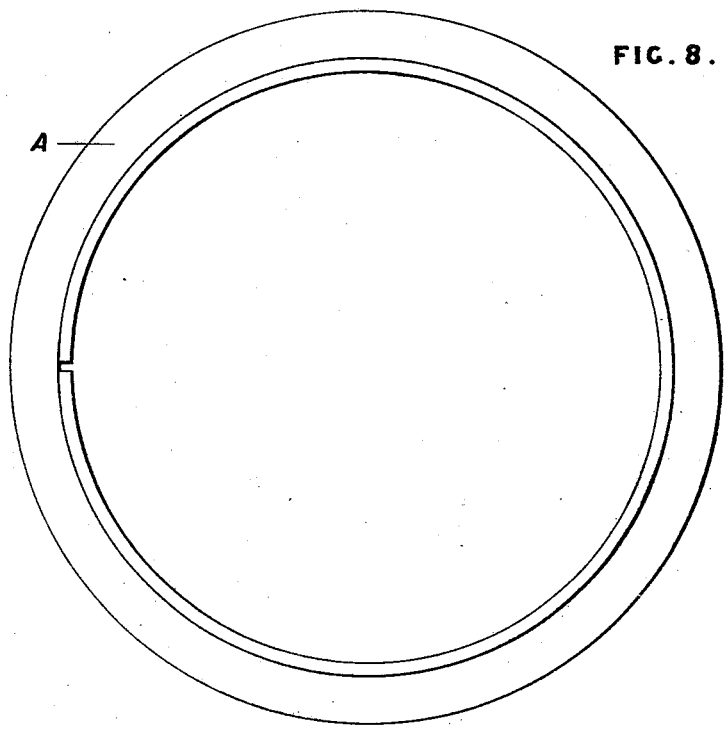
Figure 9:
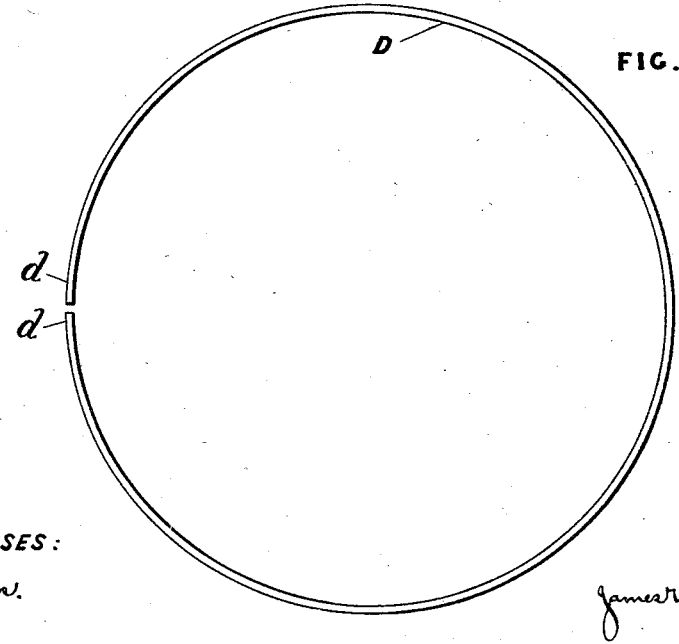

In the accompanying drawings, Figure 1 is a transverse section of a pneumatic tired rim constructed according to the present invention. Fig. 2 is a transverse section of the rim showing the flat pieces of metal which lie across the grooves of the rim between the open ends of the fastening rings to prevent "creeping" (that is, circumferential displacement of the tire in the rim). Fig. 3 is a similar view illustrating the way in which I prefer to secure these flat pieces of metal in the rim. Fig. 4. is a separate side elevation of one of the flat pieces of metal used in Fig. 3. Fig. 5 is a corresponding end elevation. Fig. 6 is a transverse section representing a modified construction of tire. Fig. 7 shows a tire fastened to the rim by open rings made of solid material. In Fig. 7<sup>A</sup>, the whole of the rubber pertaining to the cover lies outside the rim. Fig. 8 is a diagram illustrating the cover in side elevation. Fig. 9 is a corresponding diagram of one of the two open rings by which the cover is fastened to the rim.

Some pneumatic tires are wired on the rim; the wires either being endless or having ends hooked or otherwise coupled together. With endless wires, which are made by bending single lengths of wire and brazing or otherwise joining the ends, the wires and also the rims have to be exactly to gage, and there is no special provision against creeping. Such wires, moreover, frequently break at the joint. With these wire rings, a deep and consequently heavy rim ill adapted to bear the pressure due to the inflation of the tire is also used.

With wires having ends hooked together, there is difficulty in connecting the ends when attaching the tire; a special tool having to be employed. In addition, there is risk of the hooked coupling giving way, and a considerable gap is left in the edge of the cover where the ends of the wire protrude. In other tires, the wires are secured by means of holes or slots in the rim, involving the use of unsightly nuts or projections, and permitting water to obtain access to the interior of the tire.

In all wired-on tires, owing to the small diameter of the wires, the cover is liable to be cut or worn out by the wires, and the wires sometimes stretch and become too long or lose their shape and become too short.

In some cases, metallic bands are employed instead of wires; these bands being either tightened by special straining devices or clamped to the rim by screws and nuts.

Attempts have also been made to secure the cover of the tire to the rim by hooked rings engaging with the hooked edges of the rim; but such fastenings do not prevent the creeping of the tire and they permit water to get to the canvas and destroy it.

Other pneumatic tires have covers with enlarged continuous edges formed of rubber and textile material; these edges being pressed against the sloping sides or engaging with the inturned edges of the rim. Such enlarged edges of the cover add considerably to the weight of the tire. When they are made with hard rubber that can not be stretched, a comparatively heavy rim with central attaching and detaching groove is required. When they are made with supple rubber and abut, the cover cannot easily be detached without a tool; if they lap, one side is locked by the other, which should be taken off first, discrimination being thus called for; and, when they do not abut or lap, an air-tube with a wedge-shaped prominence is used to keep them in engagement with the rim. Whether made with hard or with supple rubber, they are liable to creep. When the edges of the cover are packed with short pieces of metal, the strain is not so evenly distributed; the deflated tire can become loose and fly off the rim; the weight is increased; and the difficulty of providing means for the prevention of creeping is augmented.

The objects of the present invention are to dispense with wires or bands strained round or clamped to the bottom of the rim for fastening on the tire; to avoid any necessity for making the rims precisely to gage; to afford special provision against creeping; to obviate the cutting of the cover by the fastenings; to enable a shallow and consequently a light rim to be employed; to facilitate attachment by allowing the tire to fit easily in the rim before inflation, and by doing away with couplings or clamping devices; to avoid interfering with the symmetrical appearance of the rim; and to so shape the rim and tire as to prevent sudden or accidental detachment in the event of puncture and consequent deflation.

In carrying out my invention, I employ a cover A A' of rubber and canvas or other fabric solutioned together, a rubber air-tube B provided with an ordinary inflating and deflating valve, a rim C C' having marginal grooves, and open or expansible fastening rings of metal or other suitable material. Each ring is preferably formed from a single length of aluminium or other metal tube D (Figs. 1 and 9) rectangular in transverse section; a space being left between the ends $d$ (Fig. 9) of the tube. The ends of the tube may be stopped with metal or other substance. Rings $D^\times$ (Figs. 7 and $7^A$) of solid material, or rings D' (Fig. 6) of metal trough-shaped in transverse section, may, however, be used, if desired. One ring is attached to each side of the cover A A'. The canvas or fabric A' may be wrapped round the rings D or $D^\times$ and stitched. It may also be cemented to the rings; sufficient canvas or fabric being left free near the ends of each ring to allow the cover to be stretched sufficiently to go over the edge of the rim. Or, when rings D' of metal trough-shaped in transverse section are employed, the edges of the cover may be thickened; the thickened edges $a$ being bent round and placed in the troughs, as shown in Fig. 6. These thickened edges may be cemented in the troughs; parts being left free near the ends of the troughs to enable the cover to be stretched for getting it on the rim. The rim C C' is shallow and has the edge C' on each side turned over in order to form a groove inside the rim; the grooves being adapted for the reception of and corresponding in shape with the covered rings D or $D^\times$ or partially-covered rings D'. The rings fit easily in the grooves, and consequently the friction existing between the tire and the rim is slight and does not prevent creeping. As the air-tube would soon be torn if the tire were allowed to creep, it is essential for the tire and the rim to be locked together. The simplest locking device consists of a flat piece of metal $C^\times$ (Fig. 2) made as thin as possible and brazed, soldered or otherwise secured across each groove. The piece of metal $C^\times$ may be brazed or soldered in a saw-cut or slot in the rim. In Fig. 3, the piece of metal $C^\times$ pertaining to the left-hand groove is shown so held in place; the other piece of metal being omitted in order to expose the right-hand saw-cut or slot $c$. Each of the flat pieces of metal $C^\times$ lies in the space between the ends of one of the open fastening rings; creeping being thus effectually prevented. The open rings can be easily expanded and fixed on the rim. When the rings are in the grooves of the rim, the edges of the rim, lying over the rings, prevent expansion of the rings from taking place.

Inasmuch as the air-tube B (which is made solely of pure vulcanized rubber in order that it can be permanently repaired) tends, owing to the absence of a tubular insertion of canvas or other restraining material, to force the cover A A' away from the rim C C', thus causing the fabric A' to exert an outward radial strain—that is, an expansive strain—on the open fastening rings, thereby drawing those rings away from the bottom of the rim, it is necessary for the edges C' of the rim C C' to be turned over far enough to enable them to counteract that strain with certainty.

It will be observed that a tire constructed as above described is fastened to the rim quite independently of the air pressure, that consequently the tire is secured equally well whether the air in the air-tube be at the maximum working pressure or at any lower pressure which may be desired, and that the deflated tire would be held on the rim by the fastening rings even if they were to leave the grooves, it being impossible to remove the tire without first opening the fastening rings to the requisite extent.

What I claim as my invention, and desire to secure by patent, is—

1. A pneumatic tire and rim comprising a cover, a fastening ring attached to one of the edges of the cover and made from a single length of material the ends whereof are brought close together but left unjoined, an air-tube lying within the cover, a turned-over edge of the rim, a groove beneath the turned-over edge, and a piece in the groove for the unjoined ends of the fastening ring to abut against, the fastening ring being prevented from expanding or creeping by moving it under said turned-over edge.

2. A pneumatic tire and rim comprising a cover, a fastening ring attached to one of the edges of the cover and made from a single length of material the ends whereof are brought close together but left unjoined, an air-tube lying within the cover, a turned-over edge of the rim, a groove beneath the turned-over edge, and a piece of metal secured in a slot at the side of the rim so as to occupy the space between the unjoined ends of the fastening ring, the fastening ring being prevented from expanding or creeping by moving it under said turned-over edge.

JAMES W. SMALLMAN.

Witnesses:
F. J. RAPSON,
W. F. CAIN.